Aug. 27, 1963
A. M. OLSON
3,101,955
SEAL
Filed Sept. 28, 1961
3 Sheets-Sheet 1
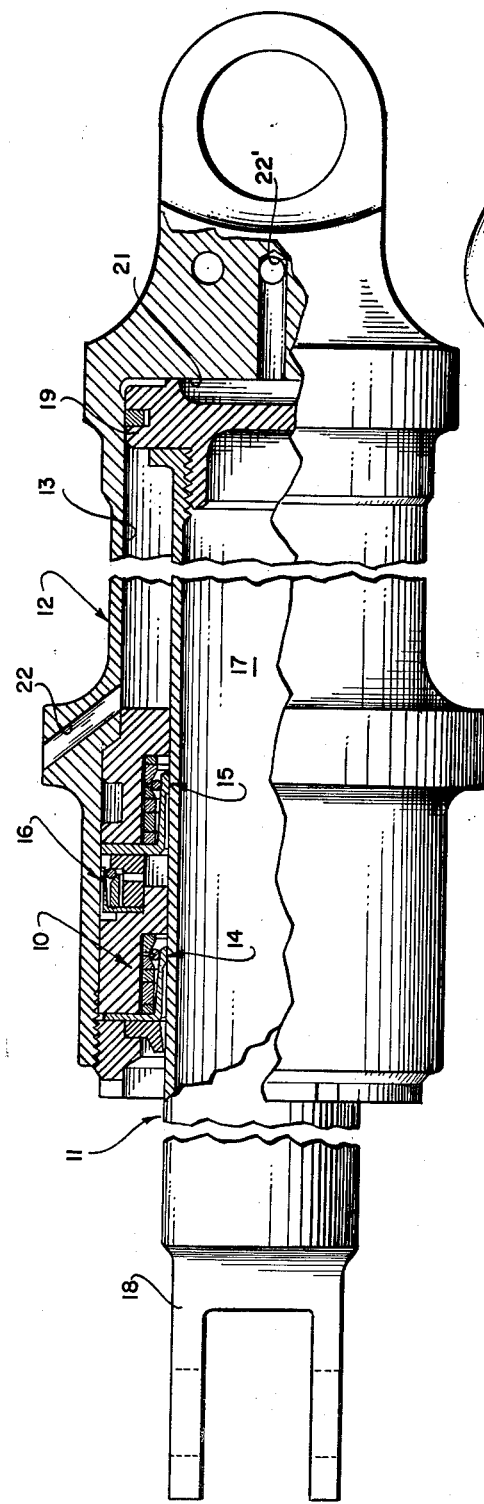
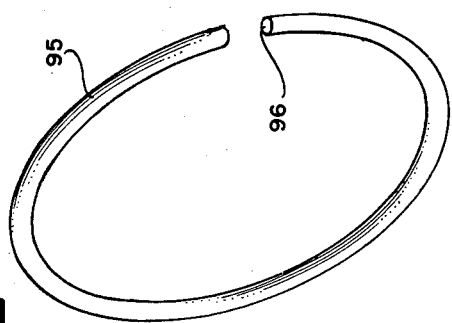
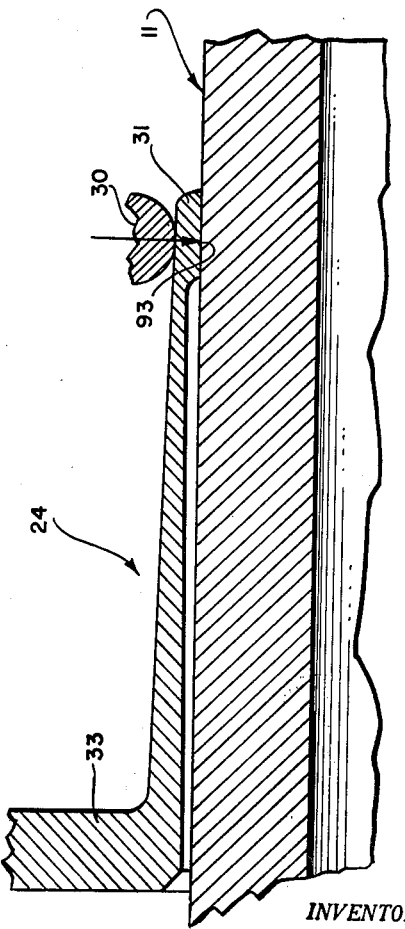
INVENTOR.
ALBERT M. OLSON
BY
*George C. Sullivan*
Agent

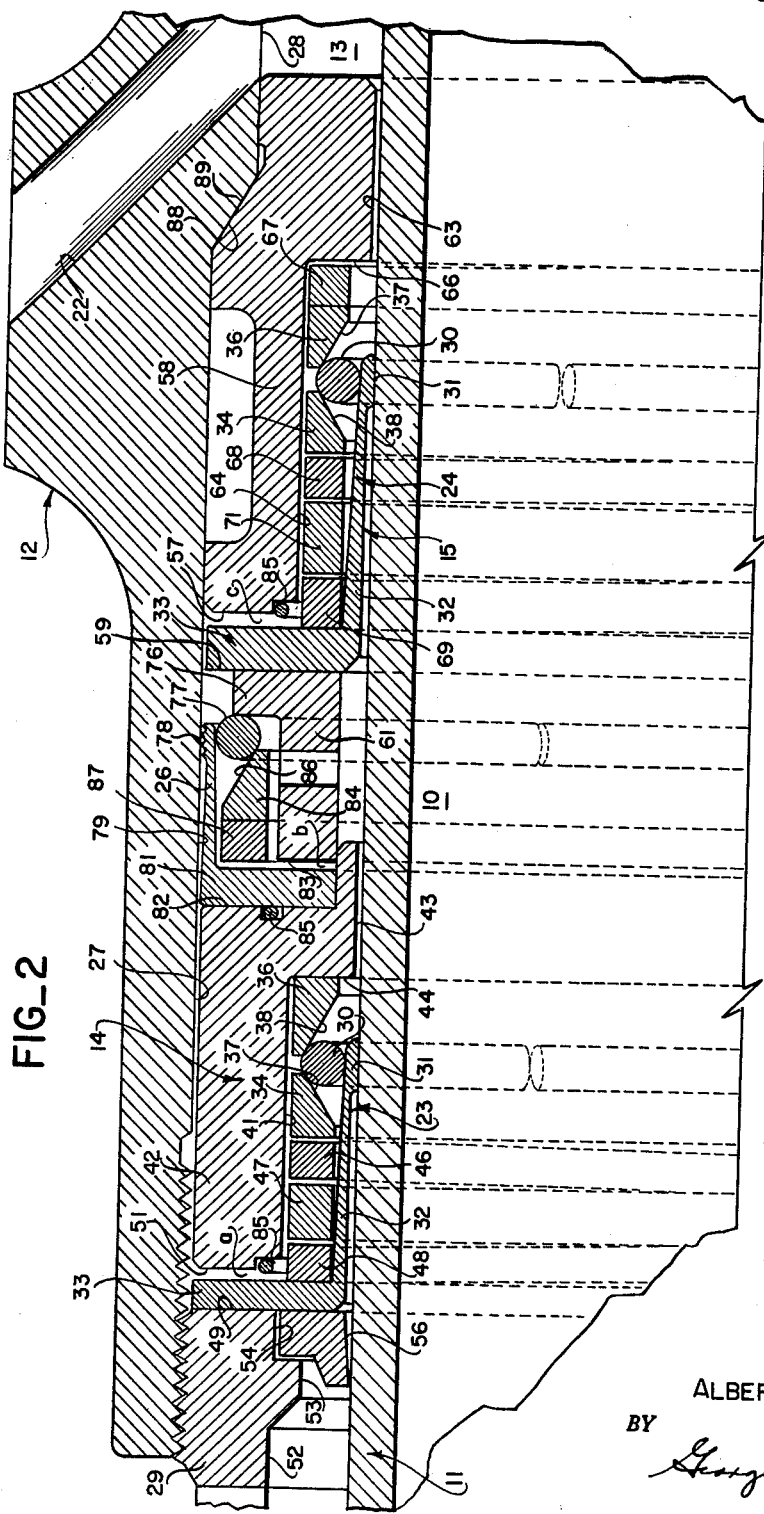

Aug. 27, 1963  A. M. OLSON  3,101,955
SEAL
Filed Sept. 28, 1961  3 Sheets-Sheet 3
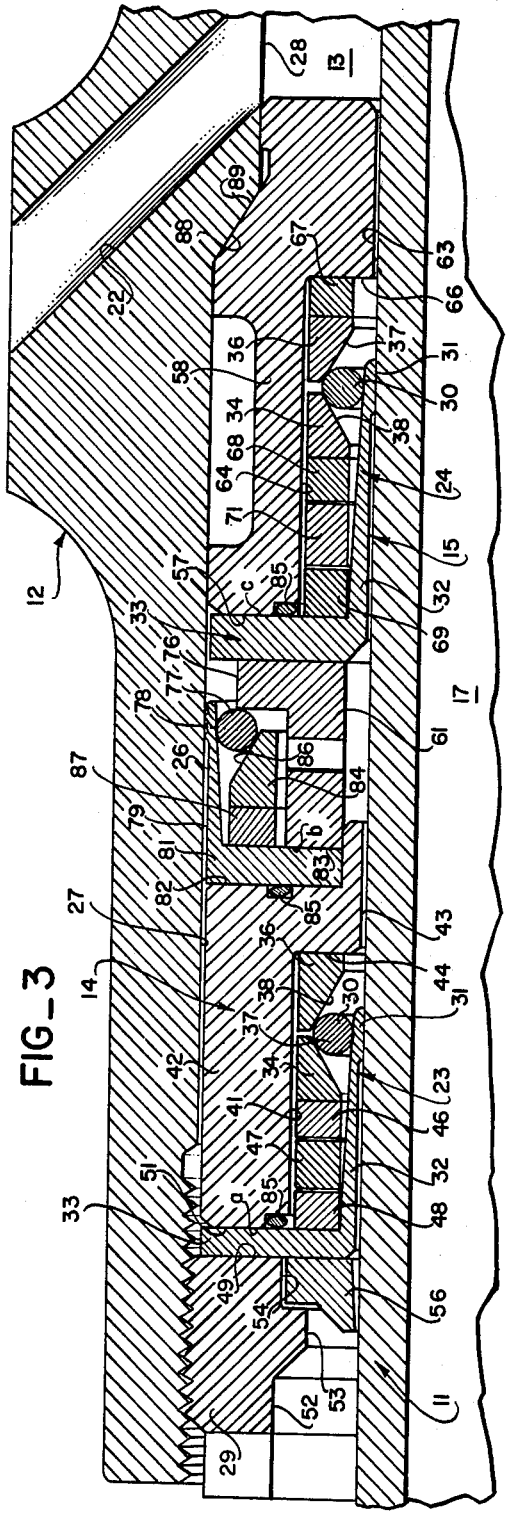
FIG_3
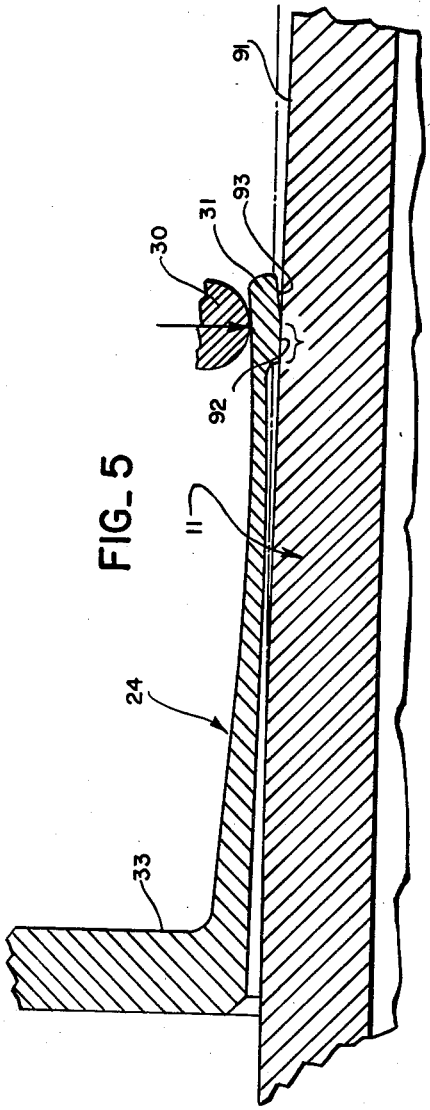
FIG_5
INVENTOR.
ALBERT M. OLSON
BY
*George C. Sullivan*
Agent

United States Patent Office 3,101,955
Patented Aug. 27, 1963

3,101,955
SEAL
Albert M. Olson, Sherman Oaks, Calif., assignor to Lockheed Aircraft Corporation, Burbank, Calif.
Filed Sept. 28, 1961, Ser. No. 141,342
13 Claims. (Cl. 277—64)

This invention relates to a dynamic seal and more partciularly to an improved metallic dynamic seal for a high temperature, high pressure cylinder having a movable tubular piston rod which is relatively thin-walled and therefore subject to radial distortion as the rod moves relative to the seal.

In general, this invention provides a new and improved metallic lip seal which will diametrically conform to radial deflection of thin walled tubing under pressure so as to avoid leakage during deflection. Normally, an O-ring seal may be used to seal around a movable rod and is able to conform to any non-roundness of the rod due to manufacturing tolerances or deformities caused by pressure. But in a cylinder operating under high temperature, a metallic high heat resistant seal is preferably used.

In many applications, a movable piston within a cylinder is hollowed out to appreciably decrease the weight of the piston rod. However, such a piston rod is, as a result, subject to radial deflection when a high pressure is applied between the cylinder wall and the exterior of the piston rod. Although metallic dynamic seals have been known to be used in the past, the disadvantage of such seals is that they are not capable of conforming to such radial deflections of thin-walled tubing and are in time deformed and unusable due to wear from constant usage.

This invention provides a new and improved dynamic lip-type metallic seal for high temperature, high pressure application which is radially preloaded to diametrically conform to radial deflections of a thin walled tube under pressure so as to avoid leakage while the piston rod or tubular member is moving relative to the seal. A lip of the seal is preloaded for wear compensation thus sealing under both high and low pressures and includes a split load ring interposed between oppositely inclined surfaces of load translating rings engaged therewith, the split load ring thereby adjusting automatically for non-roundness of the shaft due to the deformation. In response to an axial load of predetermined force applied to the load translating rings, a radial load will be applied to the split load ring to diametrically contract a seal lip of the metallic dynamic seal in relation to radial deflection of the thin walled tubing under pressure and thereby obviate leakage between the moving and stationary elements.

It is therefore an object of this invention to provide a new and improved dynamic lip-type metallic seal for high temperature, high pressure applications in which the seal is preloaded for constant sealing against high and low pressure and is self-compensating for wear.

A further object of this invention is to provide a new and improved dynamic lip-type metallic seal for high temperature, high pressure application in which the seal lip diametrically contracts in relation to radial deflection of the thin wall of the tubing when under pressure.

A still further object of this invention is to provide a dynamic lip-type metallic seal for high temperature, high pressure applications wherein the relative moving parts sealed by the dynamic seal may be fabricated in tubular form of thin-walled construction so as to appreciably decrease weight of the elements of the application.

Yet another object of this invention is to provide a new and improved lip-type metallic seal for high temperature, high pressure applications which is economical to manufacture, capable of mass production and of interchangeability of parts thereof.

A general object of this invention is to provide a new and improved dynamic lip-type metallic seal for high temperature, high pressure applications of the character described which overcomes disadvantages of prior means and methods heretofore intended to accomplish generally similar purposes.

These and other objects of this invention will be more apparent from the following detailed description, drawings and appended claims.

FIGURE 1 is a vertical, cross-sectional view as taken substantially along the longitudinal center line of a cylinder having a movable piston therein and embodying the dynamic seal of this invention;

FIGURE 2 is an enlarged, fragmentary cross-sectional view, showing the dynamic seal of FIGURE 1 in greater detail and in an unpreloaded condition;

FIGURE 3 is a cross-sectional view, similar to FIGURE 2, and illustrating the dynamic seal in a preloaded condition;

FIGURE 4 is an enlarged detail cross-sectional view illustrating the relationship of the lip of the dynamic seal to a portion of the piston rods in a low pressure condition;

FIGURE 5 is a view similar to FIGURE 4, illustrating the relationship of the dynamic seal to the piston when deflected under a high pressure condition; and FIGURE 6 is a detail perspective view of a split load ring embodied in this invention.

Referring in detail to the drawings, there is shown by way of illustration, but not of limitation, a dynamic seal designed and constructed in accordance with this invention and generally designated by the numeral 10. The dynamic seal 10 is shown and illustrated in an exemplified application for use for dynamically sealing a movable piston rod 11 relative to its cylinder 12. The dynamic seal assembly 10, in practice, preferably includes a pair of dynamic seals 14 and 15 sealing the outer surface of the piston rod 11 and a static seal generally designated by the numeral 16 for sealing the interior of the cylinder 12 so as to dynamically and statically seal an annular space or chamber 13 surrounding the piston rod 11.

Piston rod 11 is, as previously mentioned, preferably of a thin-walled construction to appreciably reduce the weight of the rod and therefore has a hollow interior 17 closed at its forward end 18 and sealed from the annular chamber 13 by a piston head 19 having a threaded connection with the piston rod 11 wherein the piston head is effective in the annular chamber 13 which is adapted for receiving a gas or a fluid under low or high pressure.

In the instant application, the annular space 13 is useful for retracting the piston head 19 and piston rod 11 whereas the chamber 21 is effective for extending the piston rod and head in response to pressure applied through suitable ports 22 and 22', respectively. The dynamic seals 14 and 15 are provided with lip supporting rings 23 and 24 of annular construction.

The intermediate static seal 16 includes a similar lip supporting ring 26 having a counterbore 27 formed in a bore 28 comprising the chambers 13 and 21. Radial load means are provided relative to each of the lip seals and responsive to an axial load placed thereagainst when the various elements of the seals are retained within the annular space 13 by a retainer member 29 to radially preload the annular lips of the lip seals 23, 24 and 26, the lips of the seals 23 and 24 being preloaded to radially contract against the moving piston rod 11 and the lip ring seal 26 being radially expanded into contact with the counterbore 27 for static seal therewith.

As best seen in FIGURES 2 and 3, each dynamic seal 14 and 15 includes a metallic split load ring member 30 surrounding a thickened edge 31 of an annular lip 32 of each of the lip seal rings 23 and 24. The annular lip 32 extends outwardly form an annular, outwardly extending flange 33 integral therewith. A pair of load translating rings 34 and 36 are juxtaposed to each split ring 30, each having an opposed conical face 37 and 38, respectively, engaging the split ring 30 so as to apply an inward radial force against the split ring 30 in response to opposed axial forces placed against the rings 34 and 36. The rings 34, 30 and 36 of the dynamic seal 14 reside within a counterbore 41 of an annular spacer 42 having a bore 43 having a clearance fit with the piston rod 11, the counterbore 41 forming an annular shoulder 44 transverse to the axis of the piston 11, with the ring 36 being abutted against the shoulder 44.

Spring means are provided for placing an axial load against the rings 34 and 36, the axial load being translated into a radial load, through the conical faces 37 and 38, against the split ring 30 to radially preload the thickened edge 31 into constant contact with the exterior of the piston rod 11. The spring means includes an annular wave washer 46 abutting the ring 34, a slip washer 47 against the washer 46 and a second wave washer 48 abutting the opposite sides of the slip washer 47.

An outwardly extending flange 33 of the lip seal 23 is sandwiched between an inner face 49 of the retainer member 29 and an outer annular face 51 of the gland 42 and is clamped therebetween in response to tightening of the retaining member 28 as will be hereinafter described. The retainer member includes an axial bore 52 tapering down to a reduced bore 53 and enlarged by a counterbore 54 in which a scraper ring 56 resides for retainment between the retaining member 28 and the flange 33 and for scraping action with the exterior of the piston rod 11.

The dynamic seal 15 is similarly constructed, having a split ring 30 surrounding a thickened edge 31 of the lip 32 of the lip seal 24, the seal 24 including a similar flange 33 retainable between an outer face 57 of an annular spacer 58 in which the split ring 30 and load translating rings 34 and 36 reside and an inner annular face 59 of an intermediate spacer 61 in which the static lip seal member 26 resides.

The spacer 58 includes a bore 63 having a clearance fit with the piston rod 11 and a counterbore 64 forming a transverse annular shoulder 66. The load translating ring 36, in the dynamic seal 15, preferably bears against an annular wave washer 67 which, in turn, bears against the annular shoulder 66. A pair of wave washers 68 and 69 similar to the washers 46 and 48 and having a slip washer 71, similar to the washer 47, therebetween is preferably provided for providing an axial load against the load translating washers 34 and 36, similarly to the wave washers of the dynamic seal 14. Each wave washer is of conventional design, having a plurality of waves transversely formed in the annular body thereof and preloaded so that when the wave washers are flattened, due to tightening of the retaining ring 29, as will be hereinafter described, an axial load is placed against the load translating rings 34 and 36 of each dynamic seal members 14 and 15 so as to, in response to the engagement of the conical surfaces 37 and 38, translate an axial load into radial loads placed against the split rings 30.

The intermediate sleeve 61 is located intermediate of sleeves 42 and 58 and includes an annular, outwardly extending flange 76 which acts as a back up ring for a split ring 77 surrounding an enlarged edge 78 of the annular lip 79 of the lip seal ring 26. The lip seal ring 26 includes an inwardly extending flange 81 clampable between an inner face 82 of the sleeve 42 and the outer face 83 of the sleeve 61. A load translating ring 84 having an external conical face 86 abutting the split ring 77 is disposed adjacent to the split ring 77. A wave washer 87, similar to the wave washers 46, 48, 67, 68 and 69, is disposed between the ring 84 and the flange 81 of the lip seal 26. The exterior surface of the enlarged edge 78 is preferably annularly serrated to provide a better gripping action with the internal counterbore 27 against which is biased by the split ring 77 when the axial load of the wave washer 87 is translated into an outward radial load against the split ring 77 by the load translating face 86. The bore 28 and the counterbore 27 form an annular shoulder 88 against which the assembly of spacers and rings is tightly secured by the fastener 29.

As best seen in FIGURE 2, when the rings and spacers are inserted in the annular space of the counterbore 27 and abutted against the shoulder 88, a gap "a" is formed between the flange 33 and the face 51 of the spacer 42, a gap "b" is formed between the flange 81 and the inner face 83 of the intermediate spacer 61, and a gap "c" is formed between the flange 33 and the outer surface 57 of the spacer 58.

To preload each of the wave washers, that is to flatten them, the retainer 29 is screwed in until all of the gaps "a," "b," and "c" are closed. In this condition, each of the wave washers 46, 48, 87, 67, 68 and 69 are flattened, as viewed in FIGURE 3, thereby preloading an axial load against the load translating washers 34, 36 and the washer 84. In response to the application of such an axial load, the surfaces 37, 38 and 86 translate the axial load into radial loads against the split rings 30 and 77 to apply a radial preload against the thickened edges of the lips of their respective lip seals 23, 24 and 26. Annular O-ring seals 85 of metal are interposed between the respective spacers and flange of lip seals in the manner illustrated for static sealing therebetween.

FIGURE 5 illustrates an exaggerated inward distortion 91 of the wall of the piston rod 11 as occurs during a high temperature, high pressure condition. It will be noted that the thickened edge lands, as for example the land 31 of the lip seal 24, due to repeated use and wear from being angularly biased into distortions and because due to the high temperature, leakage escapes as vapor and does not lubricate the lips wear unevenly to form a pair of conical surfaces 92 and 93. The surface 93 is formed when in use as with low pressures (as in FIGURE 4) while the surface 92 is worn during high pressure use (as in FIGURE 5). By this means the lands of each of the lip seals are self-aligning and self-compensating for wear and the lips of the seals diametrically conform to radial deflection of the thin walled tubing 11 under high pressure.

As best seen in FIGURE 6, each split load ring comprises an annular body 95 of resilient metal, such as hard drawn wire, and having a cylindrical cross-section. The body 95 is split as at 96 whereby the ring may be selectively preloaded inwardly for use with the lip seals 23 and 24 or outwardly for use with the lip seal 26.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

I claim:
1. A dynamic seal for a high temperature, high pressure cylinder having a movable tubular piston rod and an annular space therebetween adapted to receive a fluid or gas under pressure, comprising: an annular seal ring of metallic material in said annular space and having a radial annular flange adapted to be fixed to said cylinder and a relatively thin annular lip having a close fit with the exterior of the piston rod; a split ring around said lip; a pair of opposed load translating rings, one fore and one aft of said split ring and having conical faces engageable therewith for translating opposed axial loads placed there- against into a radial load against said split ring; a spring member juxtaposed to each of said translating rings for placing opposed axial loads thereto; and means for compressing said spring members so as to place opposed axial loads on said load translating means.

2. A dynamic seal for a high temperature, high pressure cylinder having a movable tubular piston rod and an annular space therebetween adapted to receive a fluid or gas under pressure, comprising: an annular seal ring of metallic material having a radial annular flange adapted to be fixed to said cylinder and a relatively-thin annular lip having a thickened annular outer edge having a close fit with the exterior of the piston rod; a split load ring around said thickened edge of said lip; a load translating ring fore and aft of said split ring and having a load translating face engageable therewith for translating an axial load placed thereagainst into a radial load against said split load ring; a spring member juxtaposed to each of said translating rings for placing opposed axial loads thereagainst; and means for compressing said spring members so as to place opposed axial loads on said load translating rings.

3. A dynamic seal as defined in claim 2, wherein said split load ring is annularly and inwardly preloaded around said thickened edge of said lip.

4. In a high temperature, high pressure cylinder having a movable tubular piston and an annular space therebetween adapted to receive a fluid or a gas under pressure, the combination with: a pair of annular dynamic seal means in axially spaced relationship supported in the annular space between said piston rod and said cylinder; an annular static seal means intermediate of said dynamic seal means, each of said dynamic seals comprising: an annular seal ring of metallic material having a radial annular flange adapted to be fixed to said cylinder and a relatively thin annular lip having a close fit with the exterior of the piston rod; a split load ring around said thickened edge of said annular lip; a pair of opposed load translating rings, one fore and one aft of said split load ring and each having a load translating surface engageable therewith for translating opposed axial loads placed thereagainst into and inward radial load against said split load ring; and spring means juxtaposed to each of said translating rings for placing opposed axial loads thereto; and means for mounting said dynamic seals and said static seal in said cylinders so as to preload said spring members to place opposed axial loads on said load translating rings.

5. The combination as defined in claim 4, wherein each of said annular lips includes a thickened annular edge having a close fit with the exterior of the piston rod.

6. The combination as defined in claim 5, wherein each of said load translating rings includes an annular ring having a conical face engageable with said split load ring and the faces of the load translating rings adjacent to each of said split rings being in opposed relationship.

7. In a high temperature, high pressure cylinder having a movable tubular piston and an annular space therebetween adapted to receive a fluid or a gas under pressure, the combination with: a pair of axially spaced outer annular spacer members, an intermediate spacer member therebetween and retainer means for retaining said spacer members in said annular space for non-axial movement relative to said cylinder; dynamic seal means for sealing each of said outer spacer members relative to said piston rods; each of said dynamic seal means comprising: an annular seal ring of metallic material having a radial annular flange adapted to be fixed to said cylinder and a relatively-thin annular lip having a close fit with the exterior of the piston rod; a split load ring around said lip; a pair of opposed load translating rings, one fore and one aft of said split load ring and having opposed conical surfaces engageable therewith for translating an opposed axial load placed against each into an inward radial load against said split load ring; a spring member juxtaposed to each of said translating rings for placing an opposed axial load thereto, said spring member being responsive to an axial loading by said retainer means to apply an axial load against said load translating rings for translation into a radial load against each of said split load rings; first static seal means for sealing each of said spacers to an adjacent one; and second static seal means for sealing said intermediate spacer to said cylinder.

8. The combination as defined in claim 7, wherein each of said annular lips includes a thickened annular edge having a close fit with the exterior of said piston rod.

9. The combination as defined in claim 8, wherein each of said load translating rings includes an annular ring having a conical face engageable with its adjacent split load ring and the faces of each of the load translating rings adjacent to a split load ring being in opposed relationship.

10. The combination as defined in claim 7, wherein said static seal means includes an annular seal ring of metallic material having a radial annular inwardly-extending flange adapted to be fixed to said cylinder and a relatively thin lip having a close fit with the interior of said cylinder; a second split load ring bearing outwardly against said lip; a load translating ring adjacent to said second split load ring and having a conical face engageable therewith said conical face being directed so as to translate an axial load placed thereagainst into a radial outward load against said lip; and spring means responsive to axial loading by said retainer means to apply an axial load against said load translating ring for translation thereof into an outward radial load against said second split load ring.

11. The combination as defined in claim 7, wherein said split load ring is outwardly preloaded.

12. The combination as defined in claim 7 wherein each of said spring members is a wavy spring washer having axially compressible, circumferentially spaced waves.

13. The combination as defined in claim 7 wherein each of said split load rings includes an annular body having a cylindrical cross-section and means defining a radial gap extending through said body.

References Cited in the file of this patent

UNITED STATES PATENTS

| | | |
|---|---|---|
| 550,755 | Hedley | Dec. 3, 1895 |
| 2,201,372 | Miller | May 21, 1940 |
| 2,745,687 | Stack | May 15, 1956 |
| 2,828,149 | Deventer | Mar. 25, 1958 |
| 2,857,184 | Mancusi | Oct. 21, 1958 |
| 2,931,671 | Beeley | Apr. 5, 1960 |